(No Model.)

M. GRISWOLD & M. GRISWOLD, Jr.
GRIDIRON.

No. 472,537. Patented Apr. 12, 1892.

Witnesses
Edwin L. Bradford

Inventors:
Matthew Griswold,
Matthew Griswold Jr.
By A. L. Smith & Son
Attorneys

UNITED STATES PATENT OFFICE.

MATTHEW GRISWOLD AND MATTHEW GRISWOLD, JR., OF ERIE, PENNSYLVANIA.

GRIDIRON.

SPECIFICATION forming part of Letters Patent No. 472,537, dated April 12, 1892.

Application filed July 27, 1891. Serial No. 400,793. (No model.)

*To all whom it may concern:*

Be it known that we, MATTHEW GRISWOLD and MATTHEW GRISWOLD, Jr., both citizens of the United States, and residents of Erie, county of Erie, and State of Pennsylvania, have invented a new and useful Improvement in Gridirons, of which the following is a full, clear, and exact description, reference being had to the accompanying drawings, making part of this specification.

Our invention relates to that class of broilers employing a double or upper and lower grating, the upper one of which is made removable and has its bars when in use arranged over the spaces between the bars of the lower grate; and it consists in a novel construction and arrangement of the bars of the upper grate and in the combination therewith of certain pins and lugs or feet for insuring a proper relation of the upper to the lower grating, all as hereinafter described and claimed.

Figure 1:
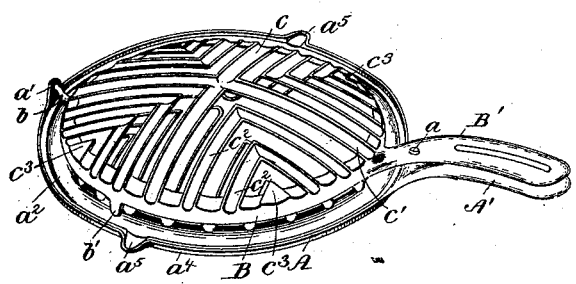
Figure 2:
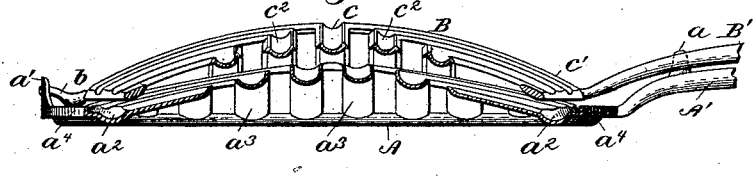
Figure 3:
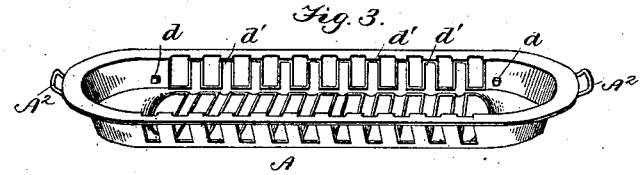

In the accompanying drawings, Figure 1 is a perspective view of one form of our improved broiler complete. Fig. 2 represents a vertical section through the same. Fig. 3 is a perspective view of the lower portion of a long broiler, showing a modification in the supports for the upper removable portion.

A indicates the lower portion or part of the broiler, and B the upper removable part thereof, each provided with a handle, that B' of the upper part overlying the handle A' of the lower part, as shown, adapting them to be grasped together in handling the broiler. The lower handle A' is provided with an upright spur $a$, which enters an eye or perforation in the upper handle B', as shown, and on the side opposite to the handle the part A has an upright perforated lug or ear $a'$, with which a projecting pin or spur $b$ on the upper part engages, as shown, said pins $a$ and $b$ serving to hold the two parts in proper relation to each other and to prevent accidental lateral displacement or movement of the parts when in use.

By slightly raising the handle B' and freeing it from the pin $a$ the part B can be removed or turned to one side, the eye in the lug $a'$ and the pin $b$ serving as a pivotal connection, permitting such lateral movement.

The part B is provided on its sides with pendent lugs or spurs $b'$, which serve as feet, resting in the outer annular groove $a^2$ of the lower part, upholding the part or grate B above the grate A and preventing its rocking on its pin-supports $a$ and $b$ when in use.

The bars of both the upper and lower portions are concavo-convex, concave on their upper faces, adapting them to receive the juices, and preferably are made arching in form from all sides to the center, as shown, the concave arching bars $a^3$ of the lower grating terminating in the annular groove $a^2$, into which the juices run and from which they may be discharged through a suitable spout or spouts $a^5$ in the rim $a^4$. The grooves in the upper bars are open at their outer ends and permit the ready escape of the juices into the groove $a^2$. The upper bars conform to the spaces between the bars of the lower grating, and in the case of the circular gridiron, such as is shown in Figs. 1 and 2, these upper bars are composed of two intersecting diametrically-arranged bars $c$ and $c'$, the angles between which are filled in by angular or V-shaped bars $c'$, $c^2$, and $c^3$, diminishing outwardly, and the outer ends of all of which bars unite in a rim $c^4$, as shown. By this construction and arrangement of the bars a ready escape for the juices in all directions is provided. These upper bars, instead of terminating at the outer edge of the groove or concavity therein and which would permit overflowing juices to trickle down under the bars and drop between the bars of the lower grate, are provided with laterally-projecting V-shaped lips $c^5$, which incline downwardly and overhang the lower bars $a^3$, as shown in Fig. 2, thereby insuring the deposition of the juices overflowing from the upper bars, obstructed by meats thereon in the lower unobstructed bars, whence they escape to the annular groove $a^2$, as explained.

In the long broiler shown in Fig. 3 instead of the feet $b'$ lugs or spurs $d$ are shown formed in the lower portion for the support of the upper grating, and the handles A² are shown applied at the ends thereof, either construction facilitating the separation of the upper from the lower grating for cleaning. In the form of broiler in the larger sizes designed to fit down into stove-openings we find it desirable to depress the horizontal bars of the lower portion and to connect such depressed bars with the rim by upright or inclined bars $d'$, between which the smoke and fumes will be drawn off into the chimney-flue when a cover is placed over the broiler, in a manner that will be readily understood.

Having thus described our invention, what we claim as new, and desire to secure by Letters Patent, is—

1. In a double broiler, the upper grate-bars formed with gutters or made concave on their upper faces and provided with laterally-projecting lips overhanging and in combination with the grooved or concave bars of the lower portion of the broiler, substantially as described.

2. In a double broiler made in disk or circular form, the upper removable portion thereof, composed of bars formed with gutters in their upper faces and also formed with laterally-projecting lips on both sides or edges overhanging and in combination with the grooved bars of the lower portion of the broiler, substantially as and for the purpose specified.

In testimony whereof we have hereunto set our hands this 24th day of July, A. D. 1891.

MATTHEW GRISWOLD.
MATTHEW GRISWOLD, JR.

Witnesses:
H. L. McWHARTER,
JOS. BORDOUR.